(12) United States Patent
Ferlemann et al.

(10) Patent No.: US 8,388,049 B2
(45) Date of Patent: Mar. 5, 2013

(54) UNDERCARRIAGE ASSEMBLY AND METHOD

(75) Inventors: Felix Ferlemann, Paderborn (DE); Wolfram Linnig, Paderborn (DE); Hans-Jürgen Neumann, Bielefeld (DE); Rolf Siekaup, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 19 days.

(21) Appl. No.: 12/850,093

(22) Filed: Aug. 4, 2010

(65) Prior Publication Data

US 2011/0037294 A1    Feb. 17, 2011

(30) Foreign Application Priority Data

Aug. 10, 2009   (DE) .......................... 10 2009 036 558

(51) Int. Cl.
*B62D 21/00* (2006.01)
*B62D 21/02* (2006.01)
*B21D 53/88* (2006.01)

(52) U.S. Cl. ........................ 296/204; 29/897.2; 280/786

(58) Field of Classification Search .................. 296/204, 296/205, 29, 203.1, 203.02, 203.03, 203.04; 280/796, 797, 798, 792, 785; 29/432, 897.2, 29/525.14; 180/311; 411/446; *B62D 21/02, B62D 21/09; B21D 53/88*

See application file for complete search history.

(56) References Cited

U.S. PATENT DOCUMENTS

| 1,649,049 | A | * | 11/1927 | Williams et al. | 411/454 |
| 3,614,124 | A | * | 10/1971 | Schwabenlender | 280/788 |
| 5,375,957 | A | * | 12/1994 | Golledge | 411/453 |
| 5,409,283 | A | * | 4/1995 | Ban | 296/35.1 |
| 5,749,692 | A | * | 5/1998 | Kish et al. | 411/453 |
| 6,361,096 | B2 | * | 3/2002 | Kim | 296/35.1 |
| 6,470,641 | B1 | * | 10/2002 | Faure | 52/480 |
| 6,739,624 | B2 | * | 5/2004 | Barber et al. | 280/781 |
| 7,325,866 | B2 | * | 2/2008 | Horton et al. | 296/205 |
| 7,562,905 | B2 | | 7/2009 | Ruste | |
| 2004/0106309 | A1 | * | 6/2004 | Larsson et al. | 439/92 |
| 2008/0222873 | A1 | | 9/2008 | Draht et al. | |
| 2009/0155020 | A1 | * | 6/2009 | Versino et al. | 411/451.2 |

FOREIGN PATENT DOCUMENTS

| DE | 10394337 T5 | 10/2006 |
| DE | 102006002238 A1 | 7/2007 |
| WO | 2007082714 A1 | 7/2007 |

OTHER PUBLICATIONS

German Patent Office, Office Action for German Application No. 10 2009 036 558.3-21 dated Mar. 3, 2010 (4 pages).

* cited by examiner

*Primary Examiner* — Glenn Dayoan
*Assistant Examiner* — Sunsurraye Westbrook
(74) *Attorney, Agent, or Firm* — Rader, Fishman & Grauer, PLLC

(57) ABSTRACT

An undercarriage assembly and related method for motor vehicles includes a base and a support positioned adjacent to the base at a connection area. At least one nail is inserted into the support and the base of the connection area, which rigidly connects the support with the base without any pre-formed fastener holes.

16 Claims, 1 Drawing Sheet

UNDERCARRIAGE ASSEMBLY AND METHOD

CLAIM OF PRIORITY

Applicants hereby claim the priority benefits under the provisions of 35 U.S.C. §119, basing said claim of priority on German Patent Application Serial No. 10 2009 036 558.3, filed on Aug. 10, 2009. In accordance with the provisions of 35 U.S.C. §119 and Rule 55(b), a certified copy of the above-listed German patent application will be filed before grant of a patent.

BACKGROUND OF THE INVENTION

The invention relates to an undercarriage assembly for a motor vehicle, and furthermore relates to a method for producing an undercarriage assembly for a motor vehicle.

Design, technological, and material considerations for reducing the weight of undercarriage components are becoming increasingly important in light of efforts undertaken to reduce fuel consumption and emissions. Efforts are therefore made to provide lightweight yet strong undercarriage components such as front axle and rear axle supports. Ambitious dynamic strength requirements are currently being met by using either individual undercarriage components that are quite thick, or by employing lightweight materials that have the required strength. Since thick components are inconsistent with the objective of light weight, the current focus is on using strong, lightweight materials.

The 6000 aluminum alloy series that is primarily used for such components generally relates to those materials that can be hardened. In this material series, high strengths are attained using a special, multi-stage thermal treatment (T6=solution heat treated and aged). A yield point greater than 200 MPa is attained. However, this increase in strength is lost during the T6 tempering process in the area of the so-called heat affected zone. For instance, the yield point drops by approximately 60% to approximately 80 MPa in the heat affected zone. This decrease in strength, which is due to heat generated during the joining process, such as fusion welding, is currently compensated for by moving the weld seams to areas having a lower load. But this design may not be entirely feasible, or it may be completely impossible, or it may have to be compensated with commensurate increases in the cross-sections of the individual parts that are to be joined. Such measures further increase the weight of the individual parts. Even though the increased thickness would theoretically be necessary only for the short segments in the heat affected zone that lose strength due to the effects of heat, especially in the case of extrusion press profiles, the increased thickness normally runs the entire length of the component. Possible rivet or screw connections require prepared holes, and as a rule, also require access from the back side of the connection, which results in higher assembly costs. In series production, it is difficult to use adhesive connections for an undercarriage, both from a cost standpoint for preparing and executing the adhesive connection, and because the strength is sometimes inadequate. Heat-free joint connections also include so-called nail connections, as described in WO 2007/082714 A1.

SUMMARY OF THE INVENTION

One object of the present invention is to provide a lightweight undercarriage assembly, the individual components of which are interconnected using a cost-effective, heat-free joining method, and an associated method for producing an undercarriage assembly using a cost-effective, heat-free joining process.

The subject-matter portion of the object is attained with an undercarriage assembly having the features set forth in patent claim 1 herein.

The method portion of the object is attained with a method having the features set forth in patent claim 12 herein.

The undercarriage assembly for a motor vehicle includes a support and a base. The support is joined to the base in a connection area by inserting at least one nail into the base and the support, without using any pre-formed or pre-punched holes for the nail.

Walls of the support and the base are overlapped in the connection area, so that the nail penetrates through both of the overlying walls when the nail is driven in. The connection area can be created, for instance, using overlapping flanges of the support and the base. The flanges are provided specifically for the nail connection. The structural design and the arrangement of the support and the base determine which component the nail will pass through first. The support preferably covers the base, so that the nail normally passes through the support first.

An adhesive layer or adhesive beading may also be applied between the support and the base. The elasticity and strength of the adhesive layer are designed such that the adhesive layer uses a material bond to impart additional strength to the positive fit and non-positive fit connection. Moreover, the adhesive layer can protect the support and base against corrosion in the connection area, and can also seal the connection area.

In the present invention, the advantageous effect of the nail connection or use of pins, provides an optimum joint for connecting the support and the base, without the need for pre-punched fastener holes. The individual assembly components may be connected even if they can only be accessed from one side of the assembly. Cartridge-fired pins, which are similar to nails, may also be used for connecting the support to the base. The pins are driven into the components at a high speed, such that the walls of the components to be connected to one another are thereby penetrated. The nail and/or cartridge-fired pin displaces the material in the assembly components to be joined. While the nail and/or cartridge-fired pin is being driven into place, the displaced material in the connection area undergoes significant plastic deformation. There is significant local heating of the assembly components because of the high speeds with which the nails or cartridge-fired pins are driven into the assembly components. After being set in place, that is, after the nails and/or cartridge-fired pins have been driven in, restoring forces in the components from the plastic deformation act on the nails and/or cartridge-fired pins. The joining mechanism for the nail connection is composed of a friction fit, a material bond, and a positive mechanical fit.

The nails can be driven in or inserted using a robot-controlled tool. The shaft portion of the nail passes through the support and the base in the connection area at a very high speed, until the bottom of the head portion of the nail is positioned against the adjacent, lateral surface of the base or support.

No bracing is required when the nail is driven into place, since the individual parts are fixed for assembly. Among other things, this interconnection permits the base to be produced from a hollow profile with optimized weight, even though the profile does not permit access to the back of the connection.

The nail may have a sawtooth-like profile on its shaft which projects outwardly in a direction transverse to the longitude of the shaft. This design increases the nail's resistance to removal, and thus simultaneously increases the strength of the connection between the support and the base. The number of nails to be used in the connection area is determined as a function of the dynamic stresses on the components in the connection area, and is also a function of the load capacity of each nail. The length and diameter of the nails may vary. Consequently, the nail's use can be adapted to connection areas that are subjected to different loads.

Connecting the support and the base using nails also makes it possible to combine different materials with one another. Thus, for instance, aluminum and steel may be combined. Moreover, the support and/or the base may comprise non-weldable, high strength aluminum alloys that contain copper or zinc.

In the present method for producing an undercarriage assembly, especially a front axle or rear axle support, the support is joined to the base in a connection area using at least one nail, and without any pre-punched fastener holes. The nail may be inserted at the connection area at a high speed, and may be controlled by a robot. The nail penetrates at least one wall of the support and also one wall of the base.

One advantage of the present inventive method is that the support and the base are joined by driving in nails without any pre-punched fastener holes, and without any heat from welding or fusion joining. In addition, in contrast to welding, the undercarriage components do not become weaker in the joint area. Thus, high-strength aluminum alloys may be used to produce undercarriage assemblies, without the components being structurally weakened in the connection area. This allows a corresponding reduction in weight compared to prior art joining methods. Naturally, in addition to being used for producing a front axle support, the present method may also be used for producing other undercarriage components, such as a rear axle support.

These and other advantages of the invention will be further understood and appreciated by those skilled in the art by reference to the following written specification, claims, and appended drawings.

BRIEF DESCRIPTION OF THE DRAWINGS

The invention shall be described in more detail in the following using an exemplary embodiment that is depicted in FIGS. 1 and 1a.

DETAILED DESCRIPTION OF THE PREFERRED EMBODIMENTS

Figure 1:
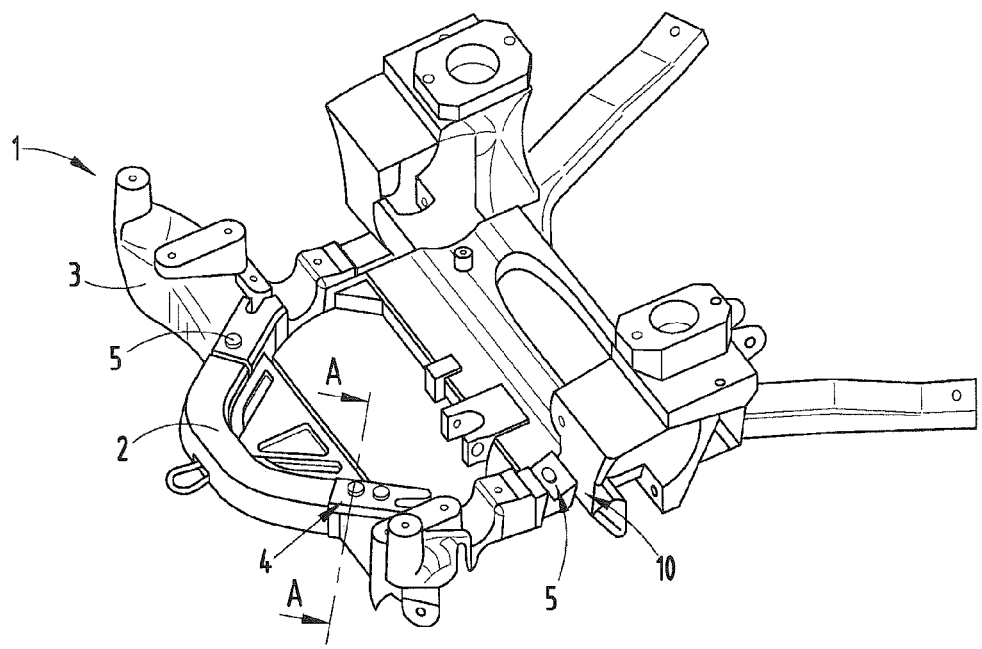
FIG. 1 is a partially schematic perspective view of an undercarriage assembly embodying the present invention.

For purposes of description herein, the terms "upper", "lower", "right", "left", "rear", "front", "vertical", "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
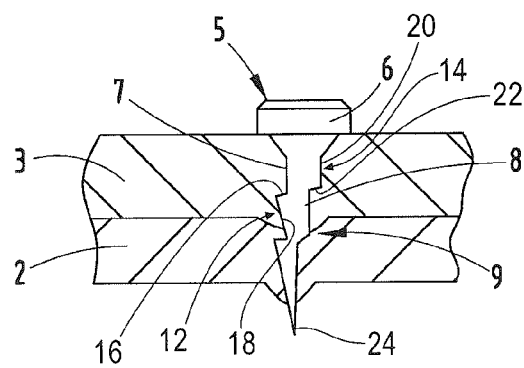
FIG. 1a is an enlarged, cross-sectional view of a joint portion of the undercarriage assembly, taken along the line "A-A", FIG. 1.

FIG. 1 depicts an undercarriage assembly 1 in the form of a front axle support. The illustrated undercarriage assembly 1 includes a base 2 that is joined to a support 3. Nails or pins 5 are used to join the base 2 to the support 3 in a connection area 4 in which base 2 and support 3 overlap. The base 2 is embodied as a curved extrusion press profile or part, and is arranged in the connection area 4 in the support 3. When the nail 5 is driven in, it first penetrates an imperforate wall portion of the support 3 before it penetrates an imperforate wall portion of the base 2 disposed adjacent thereto (FIG. 1a). The nail 5 is inserted or driven in until a bottom surface of the nail head 6 presses against and/or into an outward facing lateral surface 7 of the support 3. The material for the support 3 and the base 2 deforms plastically about the shaft 8 of the nail 5 when the nail 5 is driven in.

The illustrated nail 5 has a sawtooth-like profile 9 on the shaft 8 that runs or protrudes transversely to the longitudinal axis of the shaft 8. This sawtooth-like profile 9 increases the strength of the connection between the support 3 and the base 2.

As may be seen in the embodiment of FIG. 1a, on a first side of the shaft 8 are a series of sawtooth barbs 12 and on a second side of the shaft 8 are a series of steps 14. Each barb 12 includes a stepped retaining surface 16 and a wedge surface 18 that intersects the retaining surface 16 to form a tip, the retaining surface 16 extending transversely outward at a first angle relative to the longitudinal axis and defining a transverse dimension from the next adjacent wedge surface 18. The retaining surfaces 16 face the head 6 of the nail 5. The wedge surfaces 18 extend outwardly at a second angle relative to the longitudinal axis. As may be seen, the second angle is significantly smaller than the first angle.

Each step 14 includes a first surface 20 that is approximately parallel to the longitudinal axis and a second step surface 22 that extends transversely outward relative to the first surface 20 of an adjacent step. The first surfaces 20 of each step face away from the head 6 of the nail 5. Opposite the nail head 6 is a pointed tip 24 that defines a vertex.

Additional areas of overlap between different components of the assembly 1 may be created by the structural embodiment and arrangement of reinforcing flanges 10. The latter may also be provided as connection areas for adding one nail 5, or a plurality of nails 5.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. An undercarriage assembly for a motor vehicle, comprising:
    a base;
    a support positioned adjacent to said base at a connection area; and
    at least one nail inserted into said support and said base at said connection area and rigidly connecting said support with said base without any pre-foil led fastener holes, wherein the one nail includes a shaft having an enlarged head at an outer end wherein the enlarged head is defined by a generally planar undersurface, and a pointed tip defining a vertex at the other end, wherein the nail defines a longitudinal axis extending along the shaft through a center of the head and through the vertex of the pointed tip, and wherein the shaft includes a series of sawtooth barbs on a first side of the shaft, and a series of steps on a second side of the shaft, wherein the second side is substantially opposite the first side, and wherein:

each barb includes a stepped retaining surface and a wedge surface that intersects the retaining surface to form a tip, the retaining surfaces extending transversely outward at a first angle relative to longitudinal axis and defining a transverse dimension from the next adjacent wedge surface, wherein the retaining surfaces face the head of the nail, and wherein the wedge surfaces extend outwardly at a second angle relative to the longitudinal axis, wherein the second angle is significantly smaller than the first angle;

each step includes a first surface that is approximately parallel to the longitudinal axis, and a second step surface that extends transversely outward relative to a first surface of an adjacent step, and wherein the first surfaces of each step face away from the head of the nail.

2. The undercarriage assembly as set forth in claim 1, wherein:
said support and said base have flanges that overlap in said connection area.

3. The undercarriage assembly as set forth in claim 1, wherein:
said support and said base are constructed from different materials.

4. The undercarriage assembly as set forth in claim 1, wherein:
said base has a weight-optimized hollow profile.

5. The undercarriage assembly as set forth in claim 1, wherein:
said base has an extrusion press profile.

6. The undercarriage assembly as set forth in claim 1, wherein:
said base and said support are constructed from aluminum or steel.

7. The undercarriage assembly as set forth in claim 1, wherein:
said support is constructed from a high-strength aluminum alloy that contains copper or zinc.

8. The undercarriage assembly as set forth in claim 1, wherein:
said base is constructed from a high-strength aluminum alloy that contains copper or zinc.

9. The undercarriage assembly as set forth in claim 1, including:
an adhesive layer disposed between said base and said support.

10. The undercarriage assembly as set forth in claim 1, wherein:
said undercarriage assembly comprises an axle support for a front axle or for a rear axle of a motor vehicle.

11. A method for making a vehicle undercarriage, comprising:
forming a base having an imperforate portion;
forming a support having an imperforate portion;
overlapping the imperforate portions of the base and the support to define a connection area; and
providing a nail having a head and a shaft; the shaft having an asymmetrical profile in side view defined by first and second sides of the shaft;
inserting at least one said nail directly into the base and the support at the connection area, without pre-forming any fastener holes for the nail, and wherein inserting the nail plastically deforms a material of at least one of the base and the support in a manner that is significantly asymmetrical and confirms to the first and second opposite sides.

12. The method as set forth in claim 11, wherein:
said inserting step comprises inserting the nail into the base and the support at a high speed controlled by a robot.

13. An undercarriage assembly for a motor vehicle comprising:
a support;
a base; and
at least one nail inserted into said support and said base at a connection area without pre-punched holes wherein the one nail includes a shaft having an enlarged head at an outer end, and a pointed tip defining a vertex at the other end, wherein the nail defines a longitudinal axis extending along the shaft through a center of the head and through the vertex of the pointed tip, and wherein the shaft includes a series of sawtooth barbs on a first side of the shaft, and a series of steps on a second side of the shaft, wherein the second side is substantially opposite the first side, and wherein:

each barb includes a stepped retaining surface and a wedge surface that intersects the retaining surface to form a tip, the retaining surfaces extending transversely outward at a first angle relative to longitudinal axis and defining a transverse dimension from the next adjacent wedge surface, wherein the retaining surfaces face the head of the nail, and wherein the wedge surfaces extend outwardly at a second angle relative to the longitudinal axis, wherein the second angle is significantly smaller than the first angle;

each step includes a first surface that is approximately parallel to the longitudinal axis, and a second step surface that extends transversely outward relative to a first surface of an adjacent step, and wherein the first surfaces of each step face away from the head of the nail.

14. The undercarriage assembly as set forth in claim 1, wherein:
the first angle is about ninety degrees.

15. The undercarriage assembly as set forth in claim 1, wherein:
the retaining surfaces of the barbs are at about the same location along the axis as the step surfaces of the steps.

16. The undercarriage assembly as set forth in claim 15, wherein:
the barbs and steps form pairs whereby the number of barbs is equal to the number of steps.

* * * * *

UNITED STATES PATENT AND TRADEMARK OFFICE
CERTIFICATE OF CORRECTION

PATENT NO. : 8,388,049 B2
APPLICATION NO. : 12/850093
DATED : March 5, 2013
INVENTOR(S) : Felix Ferlemann et al.

Page 1 of 1

It is certified that error appears in the above-identified patent and that said Letters Patent is hereby corrected as shown below:

In the Claims:

At column 4, claim number 1, line number 61, delete "pre-foil led" and correct with pre-formed Signed and Sealed this
Twenty-first Day of May, 2013

Teresa Stanek Rea
*Acting Director of the United States Patent and Trademark Office*